United States Patent
Tyree, Jr.

[15] 3,660,985
[45] May 9, 1972

[54] METHOD AND SYSTEM FOR MAKING CARBON DIOXIDE SNOW

[72] Inventor: Lewis Tyree, Jr., 10401 South Oakley Avenue, Chicago, Ill. 60635
[22] Filed: Feb. 26, 1970
[21] Appl. No.: 14,525

[52] U.S. Cl. ............................................................. 62/10
[51] Int. Cl. ............................................................ F25j 1/00
[58] Field of Search ...................................... 62/10, 196, 514

[56] References Cited

UNITED STATES PATENTS 2,047,099   7/1936   Goosman .................................. 62/10
2,464,089   3/1949   Jones ....................................... 62/10

Primary Examiner—Norman Yudkoff
Assistant Examiner—S. Silverberg
Attorney—Anderson, Luedeka, Fitch, Even and Tabin

[57] ABSTRACT

A system for making particulate solid $CO_2$ using a storage vessel holding liquid $CO_2$ at high pressure, a tank connected to the storage vessel and expansion means for expanding the high pressure liquid to lower pressure, lower temperature liquid plus vapor at the tank. The passage of liquid through the expansion means is controlled to obtain a desired reservoir of low temperature liquid in the tank. A compressor withdraws vapor from the tank and returns the compressed vapor to the storage vessel. Snow expansion means is connected to the tank. When snow formation is desired, the reservoir of liquid $CO_2$ in the tank is suitably raised to a high pressure, as by connecting it to the vapor in the storage vessel, and the pressurized liquid $CO_2$ from the tank is supplied to the snow expansion means.

10 Claims, 3 Drawing Figures

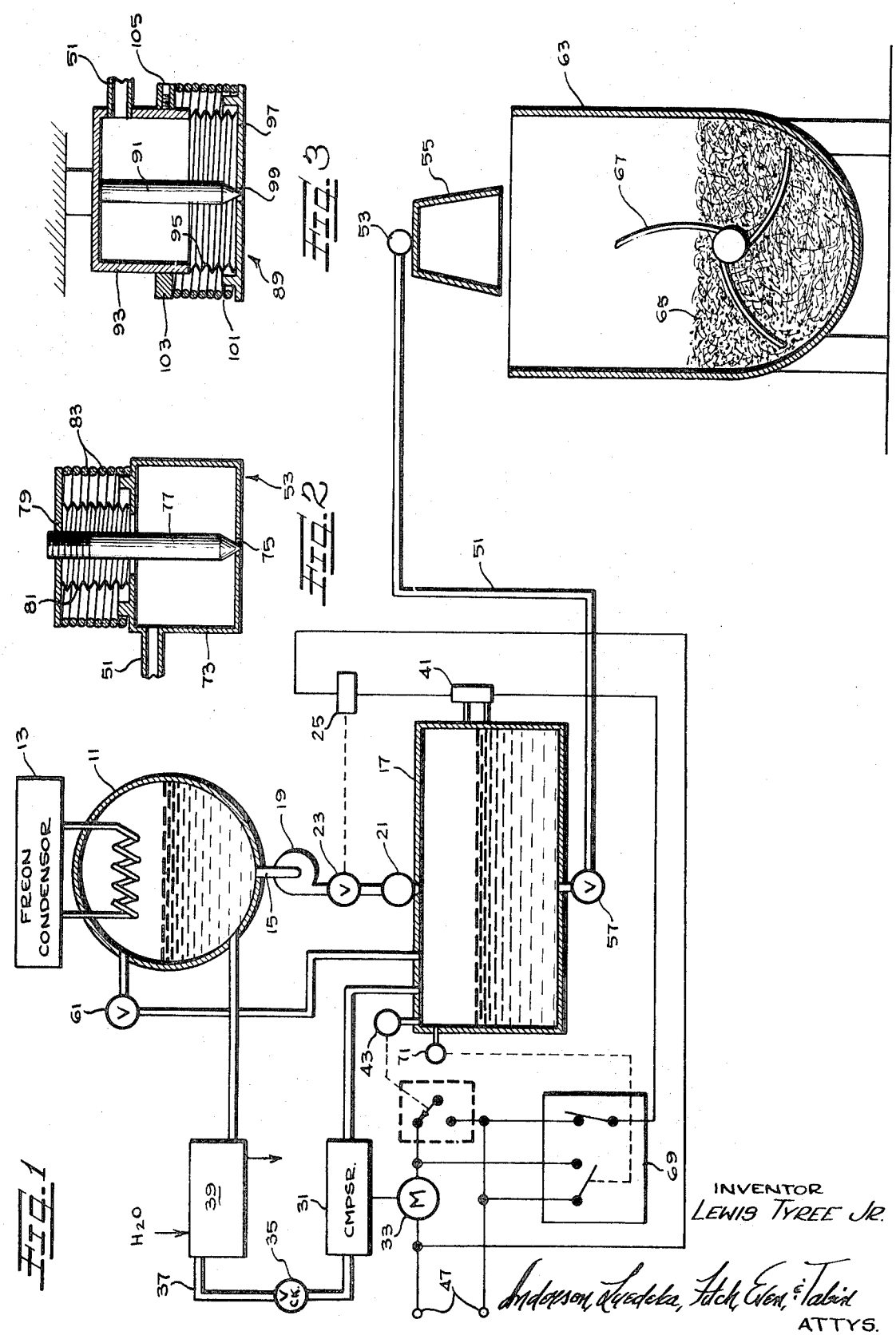

3,660,985

METHOD AND SYSTEM FOR MAKING CARBON DIOXIDE SNOW

This invention relates to the production of solid carbon dioxide and more particularly to methods for efficiently producing particulate solid carbon dioxide from high pressure liquid carbon dioxide and to systems for carrying out such methods.

Liquid carbon dioxide is available in the normal carbon dioxide storage tank at a pressure of about 300 psig. and 0° F. If this available liquid is flashed to carbon dioxide snow at atmospheric pressure through the usual expansion nozzle, approximately 47 percent by weight of the liquid carbon dioxide is changed to snow and 53 percent by weight becomes vapor. Various attempts have been made to more efficiently produce solid carbon dioxide from such a source of liquid carbon dioxide but none of these have proved to be entirely satisfactory. For example, attempts have been made to supply such snow-making devices with lower temperature liquid carbon dioxide by employing vaporization of a portion of the liquid carbon dioxide to lower the equilibrium temperature and pressure of the remaining liquid. However, such systems have not operated satisfactorily as a result of premature flashing of the liquid carbon dioxide to snow within the orifices and other expansion mechanisms, resulting in plugging and inefficient operation thereof. As a result, systems such as these have been generally limited to operation at conditions of about −20° F. and 225 psig., which are only capable of producing about 50 percent snow and 50 percent vapor. Greater efficiency is desired, especially for systems having the design capability of periodically producing relatively large quantities of particulate solid carbon dioxide in short periods of time.

It is an object of the present invention to provide efficient methods for making solid carbon dioxide from high pressure liquid carbon dioxide. Another object is to provide efficient apparatus for periodically making particulate carbon dioxide for immediate use in cooling processes. Still another object is to provide an improved system for producing relatively large quantities of particulate solid $CO_2$ in fairly short periods of time. A further object is to provide an efficient system for performing such methods which is adapted for operation in conjunction with the normal liquid carbon dioxide storage tanks employed in the United States today.

These and other objects of the invention should be apparent from the following detailed descriptions of various systems for carrying out the invention when read in conjunction with the accompanying drawings wherein:

FIG. 1 is a diagrammatic view of a system for making carbon dioxide snow by the expansion of liquid carbon dioxide embodying various features of the invention;

FIG. 2 is an enlarged view of a valve employed in the system shown in FIG. 1; and 3 is an alternative embodiment of a valve which might be employed in place of that shown in FIG. 2.

Briefly, it has been found that relatively large batches of particulate solid carbon dioxide can be efficiently produced by first cooling the high pressure liquid carbon dioxide normally available at equilibrium pressures by expanding the liquid carbon dioxide and by then repressurizing the cooled liquid carbon dioxide prior to its ultimate expansion to snow. The inherent cooling power of liquid carbon dioxide may be economically used to cool the high pressure liquid carbon dioxide to temperatures as low as about −70° F. By subsequently increasing the pressure of the cooled liquid carbon dioxide, for example to about 300 psig., and then expanding to atmospheric pressure to form snow, an excellent percentage of the subcooled liquid $CO_2$ turns to snow relative to the percentage which turns to vapor. Moreover, the repressurization of the cooled liquid $CO_2$ produces an immediately available reservoir of subcooled high pressure $CO_2$ which is ready to be expanded to produce a large batch of particulate solid carbon dioxide.

As shown in the drawing, a normal carbon dioxide liquid storage vessel 11 is employed, which is designed for the storage of liquid carbon dioxide at about 300 psig. and 0° F. A refrigeration unit 13, such as a freon condenser, is associated with the storage vessel 11 and is designed to operate continuously, if need be, to condense carbon dioxide vapor in the vessel to liquid. The capacity of the freon condensing unit 13, which is a well known device often used for this purpose, is determined by the operating conditions of the overall installation. It may, for example, be designed to condense 50 pounds of carbon dioxide an hour at 300 psig., a capacity of some 1,200 pounds of carbon dioxide a day.

A line 15 connects the liquid phase of the storage vessel 11 to a holding tank 17. If desired because of the length of run, a pump 19 may be included in the liquid line 15. A suitable expansion device 21, such as an expansion valve, is located in association with the holding tank 17 at the end of the line 15. The flow of liquid to the expansion valve 21 is controlled via a valve 23 which is opened or closed by a solenoid 25. The expansion valve 21 is designed to efficiently expand the liquid, which enters under about 300 psig., to a vapor-liquid mixture at about 85 psia, which mixture has equilibrium temperature of about −65° F.

Carbon dioxide vapor from the holding tank 17 exits via an upper outlet 29 leading to the intake of a compressor 31 driven by an electric motor 33 which raises the pressure of the carbon dioxide vapor to about 300 psig. and discharges it past a check valve 35 and into a return line 37 leading back to the storage vessel 11. The high pressure gas is relatively warm as a result of the heat absorbed in the compressor 31, and a water-cooled heat exchanger 39 or the like is preferably installed in the return line 37 in order to extract some of this heat from the gas before it reaches the storage vessel 11.

Similarly, a condenser may, if desired, be installed in the return line 37 to reliquify the gas before returning it to the storage vessel. However, in the illustrated embodiment, the warm high pressure gas is bubbled into the liquid carbon dioxide phase in the storage vessel 11. In this manner, the body of liquid carbon dioxide acts as a thermal flywheel, and the freon refrigeration unit 13 associated with the storage vessel 11 is utilized to carry out the reliquification of the high pressure gas. Depending upon the relative capacities of the storage vessel 11 and any existing refrigeration unit 13 associated with it and upon the rate at which such a solid carbon dioxide production system is intended to be utilized throughout the day, it may be desirable to include an ancillary freon condenser in the return line 37 when a system is being installed which will utilize some existing equipment.

The conditions within the holding tank 17 are appropriately regulated to create a reservoir of cold, low pressure, liquid carbon dioxide of the desired amount therein. The compressor is used to achieve the desired equilibrium pressure in the holding tank 17. The desired level of liquid carbon dioxide in the holding tank 17 is controlled in a suitable manner, as for example by using a float to actuate the solenoid 25 which opens and closes the valve 23. In the illustrated embodiment, a liquid level controller 41, of a type well known in the art, is used which is in fluid communication with the interior of the tank 17. The controller 41 completes an electrical circuit to the solenoid 25 whenever the liquid level is below the desired predetermined depth and opens the circuit when a depth slightly above that desired is reached. Once the solenoid-actuated valve 23 is opened, liquid carbon dioxide is supplied to the expansion valve 21.

The compressor 31 is allowed to run during the initial fill of the tank whenever the vapor pressure exceeds a certain value. The inflow of liquid into the holding tank 17 continues until the level is reached which causes the controller 41 to open the circuit, removing power from the solenoid 25 and causing the valve 23 to be closed. A pressure-sensitive switch 43 which reads the vapor pressure within the tank is included to actuate the compressor 31 whenever the pressure exceeds a certain value. The pressure-sensitive switch 43 has a set of contacts 45 which are disposed between a source 47 of electric power and the motor 33 for driving the compressor 31. The switch 43 may be adjustably set to complete the circuit through the first set of contacts 45 whenever the desired vapor pressure in the tank 17 is exceeded for example about 90 psia. Should the withdrawal of vapor from the holding tank 17 and subsequent evaporation of additional liquid cause the liquid level within the tank to slowly drop below the desired level, more liquid is admitted through the valve 23. Some cycling of the valve 25 and the compressor 31 may occur as the filling of the tank 17 nears completion. Should the reservoir of cooled liquid be maintained for some time before its expansion to snow, the flow of heat into the tank 17 through its walls may result in evaporation of further liquid $CO_2$ and the supply of more liquid to the tank 17. By maintaining a desired pressure range from about 80 psia. to about 90 psia. in the tank 17 an equilibrium temperature of carbon dioxide of about −65° F. is achieved.

After the tank has substantially reached its desired liquid level, it may be desirable to avoid the inflow of liquid carbon dioxide into the holding tank 17 at a time when the vapor pressure is sufficiently high that the compressor 31 is operating. This may be accomplished in any suitable manner, as by opening the circuit through the solenoid 25 whenever the compressor 31 is operating. By thus controlling the operation of the solenoid 25 in this manner, a situation is avoided wherein the compressor 31 might possibly run continuously because the solenoid valve 23 was open and supplying high pressure liquid carbon dioxide to the expansion valve 21. However, it is also noted that so long as the liquid and vapor within the holding tank 17 are maintained in equilibrium, the compressor operation could also be controlled by monitoring the temperature of the liquid or the vapor, as well as by monitoring the vapor pressure as in illustrated embodiment.

The ultimate purpose of the system as described heretofore is to provide a relatively large reservoir of cooled liquid $CO_2$ which can be immediately repressurized when needed and then fed through a line 51 to an expansion device 53, which is a part of a snow horn 55 or the like. A valve 57 is provided in the line 51 to stop and start the supply of the cooled liquid $CO_2$ from the tank 17 to the expansion device 53. In order to facilitate transformation of the cooled liquid $CO_2$ to solid $CO_2$, it has been found to be important to raise the pressure of the liquid prior to its expansion so that tendency of the expansion device to clog is minimized and also to prevent the occurrence of local pressure drops in the line 51 which might result in snow formation in the line that could also clog the system. The pressure should be raised to at least about 100 psia. above the pressure at the outlet of the snow horn, and preferably the tank is pressurized to about 250 psig.

Any suitable source of pressure can be used to repressurize the cooled liquid $CO_2$ before it is fed to the expansion device, and the pressure may be increased as high as convenient, within reasonable limits. The vapor pressure in the storage vessel 11 is readily available as a pressure source and is preferably used for this purpose. Accordingly, a line 59 is provided which is in fluid communication with the vapor portion of the storage vessel 11 and the holding tank 17, the line 59 being opened or closed by a valve 61. When the approximate 300 psig. is applied to reservoir of liquid in the tank 17 and the valve 57 is opened, the expansion of the subcooled liquid carbon dioxide through the device 53 results in the efficient production of carbon dioxide snow. Expanding liquid carbon dioxide at about −60° F. through the device 53 creates about 57 percent solid $CO_2$ snow and 43 percent by weight $CO_2$ vapor which is considered to be excellent efficiency in transformation for an expansion device of this type.

In the illustrated system, this particulate $CO_2$ snow is directed into a mixing chamber 63 wherein a product 65, such as ground meat or sausage, is being chilled. The snow is continuously mixed with the products being chilled by the assistance of a rotating impeller 67 or the like. Although it might be possible to reclaim the carbon dioxide vapor which is created at the snow horn 55, in most commercial operations it is not considered to be economically practical to attempt to recover this gas, and it is simply vented to the atmosphere from the mixing chamber 63.

It has been found that even more efficient production, from the standpoint of supplying a relatively large quantity of particulate solid $CO_2$ using equipment of a given capacity, can be obtained if $CO_2$ slush is created in the holding tank 17. Inasmuch as such slush inherently includes solid $CO_2$, it can be seen that the ratio of pounds of particulate solid $CO_2$ exiting from the snow horn, relative to the pounds of $CO_2$ feed supplied to the snow horn, will be improved when some of the feed is already in the solid state. Thus, when it is desired to provide a relatively large quantity of solid $CO_2$ in a relatively short period of time, for example for a batch freezing operation, then a preliminary conversion to slush facilitates achieving this objective.

By reducing the pressure of the cooled liquid $CO_2$ in the holding tank to at least as low as about 75 psia, and preferably to less than about 60 psia, a layer of solid $CO_2$ is formed near the surface of the liquid in the tank. The density of solid $CO_2$ is greater than that of liquid $CO_2$. It has been found that if such a pressure reduction is carried out on an intermittent basis, the layer which has been formed near the surface will sink to the bottom of the tank during the period while compressor operation is halted. Such intermittent formation and sinking avoids the creation of large chunks and instead creates $CO_2$ slush which can thereafter be handled as a liquid. By such intermittent operation of the compressor, the desired percentage of liquid $CO_2$ in the tank 17 can be turned to slush. It has been found that, if a pressure of from about 250 to 300 psig. is available to drive the $CO_2$ feed through the expansion device 53 of the snow horn, slush which contains up to about 50 percent solid $CO_2$ can be handled without clogging the expansion device or the line 51 leading thereto.

When it is desired to operate the system on a basis where the $CO_2$ reservoir in the holding tank 17 is turned to slush, the tank is generally initially filled to a desired level before the slush creation is begun, and thereafter further liquid $CO_2$ is not supplied to the holding tank. To facilitate the slushing operation, a suitable control mechanism 69 is provided which opens a circuit to the solenoid 25, thus assuring that the control valve 23 remains closed after the slushing operation has begun. A separate control, such as another pressure-sensitive switch 71, is provided in the tank 17 which reads the pressure and is connected to the control mechanism 69, which in turn operates the compressor 31 to lower the vapor pressure below the desired level, e.g., below about 60 psia.

The control mechanism 69 is designed to program the intermittent operation whereby a periodic lull in compressor operation is provided after sufficient time has passed to create a significant layer of solid $CO_2$ near the surface. During this lull, the solid $CO_2$ sinks to the bottom of the tank. Any suitable means may be employed to program the length of the periods of reduced pressure. For example, the control mechanism 69 might operate on a time basis for the individual off-on cycles, while counting the total number of cycles and disabling the compressor 31 from further operation after the desired number of cycles had occurred which should create about 50 percent (or any desired percentage) of solid $CO_2$ in the tank.

FIG. 2 illustrates the expansion device 53 at the snow horn 55 which is designed to operate with a variable orifice and to close completely when the pressure of the $CO_2$ being supplied falls below a certain minimum level. It has been found that this design eliminates the tendency for snow formation on the feed side of the expansion device 53 and accordingly reduces maintenance and possible shutdown time. If the orifice at the expansion device 53 were always open, then the liquid carbon dioxide in the supply line 51 between the shutoff valve 57 and the snow horn would relatively quickly change to solid and vaporous $CO_2$. Such a transformation on the feed side of the expansion device could cause a buildup of solid $CO_2$ in the supply line 51 that might significantly reduce the efficiency by creating a large pressure drop at this point and might ultimately result in completely clogging the line.

By providing an expansion device 53 which closes completely at a certain minimum pressure, that pressure is maintained on the feed side of the expansion device 53. Whenever during operation the shutoff valve 57 is closed, the expansion device 53 also closes, and it remains closed until warming of the liquid $CO_2$ in the line 51 causes sufficient evaporation to exceed the minimum pressure. At this point the device 53 allows the high pressure vapor or liquid to leak through the orifice maintaining a relative constant pressure in the line 51. Because of the maintenance of the high pressure, undesirable snow formation on the feed side of the snow horn is accordingly avoided.

In the device 53 shown in FIG. 2, a housing 73 is provided which has a circular orifice 75 in its bottom wall. The housing 73 provides a hollow chamber of circular cross section extending upward from the bottom wall, and a fitting in the side wall of the housing provides a connection to the feed line 51. A large opening is provided in the upper wall of the housing through which a cylindrical plug 77 extends. The plug has a conical lower end which, when seated in the orifice, completely halts the passage of fluid therethrough. The upper end of the plug 77 is affixed to a movable plate 79 that is supported via a bellows 81 attached to the upper wall of the housing 73 in surrounding relationship to the opening therein. A tension spring 83 is affixed to the perimeter of the movable plate 79 and to the housing 73, thus biasing the plate 79 toward the housing 73 and seating the conical lower end of the plug 77 in the orifice 75. The connection between the plug 77 and the movable plate 79 is made via a threaded hole in the plate which receives mating threads on the upper end of the plug, and this arrangement facilitates adjustment of the pressure at which the orifice becomes open. The tension spring 83 is wound with a pre-load to prevent any relative movement between the plug 77 and the orifice 75 until a certain minimum pressure is reached.

As can be seen, the orifice 75 remains closed until the pressure in the feed line 51 and the hollow interior of the housing-bellows combination is sufficient to overcome the biasing of the pre-loaded spring. The plate 79 then moves away from the housing 73 as the bellows 81 extends, raising the plug 77 and providing an annular opening between the circular orifice and the conical lower surface of the plug. For example, the plug 77 might be rotated (and then held in position by a lock nut or a set screw arrangement or the like) so that the orifice will be closed whenever the pressure on the feed side drops below about 200 psia. Accordingly, production of solid $CO_2$ ahead of the expansion device 53 is avoided because, at this pressure, the liquid in the supply line 51 either remains liquid or turns slowly to vapor.

FIG. 3 illustrates a modified version of an expansion device 89 which might be employed that is generally similar to the device 53. The expansion device 89 includes a tapered plug 91 which is fixedly mounted to a housing 93 into which the supply line 51 is connected. The lower end of the housing 93 is attached to a bellows 95 which supports a plate 97 wherein a circular orifice 99 is provided. A spring 101 is attached at its lower end to the plate 97 and at its upper end to a sleeve 103 which slides on the outer surface of the housing 93. The sleeve 103 is held in place by a set screw 105, and it is employed to adjust the tension at which the plate 97 is biased to the closed position against the lower end of the tapered plug 91. As can be seen, the buildup of a desired minimum pressure in the housing 93 causes the bellows 95 to expand and open the orifice 99.

On a materials balance for the overall system wherein the reservoir in the tank 17 is brought to equilibrium conditions of about $-65°$ F. and 85 psia. and no slush is formed, it is found that, for each 10 pounds of liquid carbon dioxide supplied to the expansion device 53, approximately 12.5 pounds of liquid carbon dioxide is fed through the line 15 from the storage vessel 11. The remaining 2.5 pounds of the initial 12.5 pounds of liquid carbon dioxide are vaporized in the holding tank 17, recovered and returned to the storage vessel 11 via the compressor 31. At the expansion device 53, 10 pounds of liquid carbon dioxide at about 300 psig. and $-60°$ F. expand to 57 percent by weight carbon dioxide snow and 43 percent by weight $CO_2$ vapor. When $CO_2$ slush which is about 50 percent solid $CO_2$ is employed, for each 10 pounds of $CO_2$ supplied to the snow horn 55, approximately 7.75 pounds of particulate solid $CO_2$ is obtained.

The ability to transform greater than 50 percent of the liquid $CO_2$ to carbon dioxide snow affords substantial economic advantages. Moreover, the immediate availability of a large reservoir of low temperature liquid $CO_2$ which is ready to be fed to the snow-making device 55 fills the need for cooling or freezing processes which periodically require large batches of particulate solid $CO_2$. Moreover, by employing slush formation, the size of the batch which can be provided from equipment of a given capacity is further increased.

Modifications to the illustrated embodiments as would be obvious to one having the ordinary skill in the art are considered as falling within the scope of the invention which is defined by the claims appended hereto.

Various of the features of the invention are set forth in the following claims.

What is claimed is:

1. A method for making $CO_2$ snow which method comprises supplying liquid $CO_2$ from a storage vessel at high pressure to a tank and expanding said high pressure liquid $CO_2$ at said tank to a lower pressure lower temperature liquid plus vapor and thereby providing a desired reservoir of said low temperature liquid $CO_2$ in said tank, withdrawing vapor from said tank and compressing said withdrawn vapor for return to said storage vessel, and periodically repressurizing said low pressure liquid $CO_2$ in said tank to a higher pressure by connecting said tank in fluid communication with the $CO_2$ vapor in said high pressure storage vessel and transferring said repressurized high pressure low temperature liquid $CO_2$ to expansion means whereat it is expanded to $CO_2$ snow and vapor, said low temperature high pressure liquid $CO_2$ producing $CO_2$ snow in an amount more than 50 weight percent of said transferred liquid $CO_2$.

2. A method for making $CO_2$ snow which method comprises supplying liquid $CO_2$ from a storage vessel at high pressure to a tank and expanding said high pressure liquid $CO_2$ at said tank to a lower pressure lower temperature liquid plus vapor and thereby providing a desired reservoir of said low temperature liquid $CO_2$ in said tank, withdrawing vapor from said tank and compressing said withdrawn vapor for return to said storage vessel, periodically repressurizing said low pressure liquid $CO_2$ to a higher pressure and transferring said repressurized high pressure low temperature liquid $CO_2$ to expansion means whereat it is expanded to $CO_2$ snow and vapor, said low temperature high pressure liquid $CO_2$ producing $CO_2$ snow in an amount more than 50 weight percent of said transferred liquid $CO_2$, and maintaining a pressure of at least about 100 psia. on the feed side of said second expansion means between said periodic repressurizing of said low temperature liquid $CO_2$ in said tank to positively prevent the formation of solid $CO_2$ on the feed side of said second expansion means.

3. A method for making $CO_2$ snow which method comprises supplying liquid $CO_2$ from a storage vessel at high pressure to a tank and expanding said high pressure liquid $CO_2$ at said tank to a lower pressure lower temperature liquid plus vapor and thereby providing a desired reservoir of said low temperature liquid $CO_2$ in said tank, withdrawing vapor from said tank and compressing said withdrawn vapor for return to said storage vessel, initially establishing a reservoir of liquid $CO_2$ in said tank at a temperature above $-70°$ F. and then intermittently lowering said pressure within said tank below about 75 psia. to cause formation of successive layers of solid $CO_2$ at about the surface of said liquid $CO_2$, resulting in the creation of $CO_2$ slush in said tank, and periodically pressurizing said $CO_2$ slush to a higher pressure and transferring said higher pressure $CO_2$ slush to expansion means whereat it is expanded to $CO_2$ snow and vapor.

4. A method in accordance with claim 3 wherein said slush contains not more than about 50 percent by weight solid $CO_2$.

5. A system for making $CO_2$ snow which system comprises a storage vessel for holding liquid $CO_2$ at high pressure, a tank, first conduit means for supplying liquid from said vessel to said tank, first expansion means in association with said tank for expanding said high pressure liquid from said first conduit means to lower pressure lower temperature liquid plus vapor, means for controlling the passage of liquid through said first expansion means to obtain a desired reservoir of said low temperature liquid in said tank, a compressor, means connecting the intake of said compressor to a location in said tank wherein said vapor resides, second conduit means connecting the discharge of said compressor to said storage vessel, Second expansion means for expanding the liquid to $CO_2$ snow plus $CO_2$ vapor, means for pressurizing said reservoir of liquid $CO_2$ in said tank to a high pressure substantially above that of the liquid after passing through said first expansion means, and third conduit means for supplying said pressurized liquid $CO_2$ from said tank to said second expansion means whereby $CO_2$ snow is created by passage therethrough.

6. A system in accordance with claim 5 wherein fourth conduit means is provided as a part of said pressurizing means and connects said tank in fluid communication with the vapor in said high pressure storage vessel, and wherein first valve means is provided for opening and closing the passage through said fourth conduit means.

7. A system in accordance with claim 5 wherein pressure-sensitive control means is included for operating said compressor to control said $CO_2$ reservoir in said tank at a desired temperature.

8. A system in accordance with claim 6 wherein means is provided for positively preventing operation of said compressor and preventing supply of liquid $CO_2$ to said first expansion means whenever said first valve means is open.

9. A system in accordance with claim 5 wherein control means are provided for intermittently operating said compressor to lower the pressure within said tank to at least as low as about 75 psia. to cause the formation of solid $CO_2$ at about the liquid surface in said tank whereby $CO_2$ slush may be created within said tank.

10. A system in accordance with claim 6 wherein second valve means is provided for isolating said second expansion means from said tank and wherein pressure-responsive means is provided in association with said second expansion means for closing said second expansion means to prevent flow therethrough whenever the fluid pressure in said third conduit means falls below a predetermined minimum pressure, substantially above the triple point pressure of $CO_2$, whereby formation of solid $CO_2$ within said third conduit means is positively prevented.

* * * * *

UNITED STATES PATENT OFFICE
CERTIFICATE OF CORRECTION

Patent No. 3,660,985          Dated May 9, 1972

Inventor(s) Lewis Tyree, Jr.

It is certified that error appears in the above-identified patent and that said Letters Patent are hereby corrected as shown below:

Column 6, line 50, insert "second" before "expansion"

Signed and sealed this 14th day of November 1972.

(SEAL)
Attest:

EDWARD M. FLETCHER, JR.         ROBERT GOTTSCHALK
Attesting Officer                Commissioner of Patents